(12) United States Patent
Negishi

(10) Patent No.: US 9,764,462 B2
(45) Date of Patent: Sep. 19, 2017

(54) ROBOT APPARATUS AND ROBOT CONTROLLING METHOD

(71) Applicant: CANON KABUSHIKI KAISHA, Tokyo (JP)

(72) Inventor: Mahito Negishi, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 155 days.

(21) Appl. No.: 14/335,761

(22) Filed: Jul. 18, 2014

(65) Prior Publication Data
US 2015/0045954 A1   Feb. 12, 2015

(30) Foreign Application Priority Data
Aug. 6, 2013   (JP) .................................. 2013-162891

(51) Int. Cl.
*G05B 15/00*      (2006.01)
*G05B 19/00*      (2006.01)
(Continued)

(52) U.S. Cl.
CPC .............. *B25J 9/06* (2013.01); *B25J 9/1607* (2013.01); *G05B 2219/40331* (2013.01); *G05B 2219/40333* (2013.01); *G05B 2219/43203* (2013.01)

(58) Field of Classification Search
CPC ........... G05B 2219/40331; G05B 2219/40333; G05B 2219/43203
(Continued)

(56) References Cited

U.S. PATENT DOCUMENTS 4,716,350 A * 12/1987 Huang ................. G05B 19/232
                                                          318/566
5,499,320 A *  3/1996 Backes ................. B25J 9/1602
                                                          700/260
(Continued)

FOREIGN PATENT DOCUMENTS

CN        101549495 A      10/2009
CN        102495550 A       6/2012
(Continued)

OTHER PUBLICATIONS

U.S. Appl. No. 14/376,093, filed Jul. 31, 2014 by Mahito Negishi.
(Continued)

*Primary Examiner* — Harry Oh
(74) *Attorney, Agent, or Firm* — Fitzpatrick, Cella, Harper & Scinto

(57) ABSTRACT

A robot apparatus 1 includes: a multi-articulated robot 2; and a controller 3 that drive-controls the multi-articulated robot 2 based on an input motion command. The controller 3 includes: a joint angle computing unit 32 that computes each joint angle command for driving the multi-articulated robot 2 based on the motion command; a servo controlling apparatus 30 that moves the multi-articulated robot 2 by rotationally driving each rotational joint based on the joint angle command computed by the joint angle computing unit 32; a singular point calculating unit 51 that calculates a distance between the multi-articulated robot 2 and a singular point of the multi-articulated robot 2; and a maximum joint angle deviation adjusting unit 52 that limits a maximum rotation speed of a rotational joint specified in advance based on a singular point type, if the singular point distance becomes smaller than a predetermined value.

14 Claims, 12 Drawing Sheets

(51) Int. Cl.
*B25J 9/06* (2006.01)
*B25J 9/16* (2006.01)

(58) Field of Classification Search
USPC ........................................................ 700/262
See application file for complete search history.

(56) References Cited

U.S. PATENT DOCUMENTS

| | | |
|---|---|---|
| 7,591,171 B2 | 9/2009 | Negishi |
| 7,915,787 B2 | 3/2011 | Negishi et al. |
| 8,245,317 B2 | 8/2012 | Negishi |
| 8,447,561 B2 | 5/2013 | Negishi |
| 8,744,625 B2 | 6/2014 | Negishi |
| 8,749,190 B2 * | 6/2014 | Nowlin .............. A61B 19/2203 318/560 |
| 2003/0171847 A1 * | 9/2003 | Cheng ................ G05B 19/4103 700/245 |
| 2005/0125100 A1 * | 6/2005 | Stoddard ................ B25J 9/1607 700/245 |
| 2010/0204828 A1 * | 8/2010 | Yoshizawa ............ B25J 9/1666 700/245 |
| 2011/0218673 A1 * | 9/2011 | Oga ...................... B25J 9/1651 700/254 |
| 2012/0029699 A1 * | 2/2012 | Jing ...................... B25J 9/1664 700/263 |
| 2012/0158179 A1 * | 6/2012 | Ooga .................... B25J 9/1633 700/259 |

FOREIGN PATENT DOCUMENTS

| | | |
|---|---|---|
| CN | 102785248 A | 11/2012 |
| JP | S62-58302 A | 3/1987 |
| JP | S63-276606 A | 11/1988 |
| JP | 11-239988 A | 9/1999 |
| JP | H11-239988 A | 9/1999 |
| JP | 2001-100828 A | 4/2001 |
| JP | 2003-300183 A | 10/2003 |
| JP | 2003-311664 A | 11/2003 |
| JP | 2010-201592 A | 9/2010 |

OTHER PUBLICATIONS

Schreiber et al., "Solving the Singularity Problem of Non-Redundant Manipulators by Constraint Optimization", Proceedings of the 1999 IEEEASJ, 1999, pp. 1482 to 1488.
EP Office Action dated Mar. 12, 2015 for counterpart European Patent Application No. 14178882.8.
Chinese Office Action dated Sep. 22, 2015 for counterpart Chinese Patent Appln No. 201410379795.1.
Japanese Office Action dated May 9, 2017 in Japanese Application No. 2013162891.
Japanese Office Action dated Jul. 25, 2017 in Japanese Application No. 2013-162891.

* cited by examiner

JOINT SPEED LIMIT VALUE

Vmax

Vmin

θs

DISTANCE TO SINGULAR POINT

SINGULAR POINT TYPE AND ROTATIONAL JOINT TO BE SUBJECTED TO SPEED LIMITATION

|  | J1 | J2 | J3 | J4 | J5 | J6 |
|---|---|---|---|---|---|---|
| FIRST SINGULAR POINT | V | — | — | V | V | V |
| SECOND SINGULAR POINT | — | — | — | V | — | V |
| THIRD SINGULAR POINT | — | V | V | — | — | — |

V: ROTATIONAL JOINT TO BE SUBJECTED TO SPEED LIMITATION

ROBOT APPARATUS AND ROBOT CONTROLLING METHOD

BACKGROUND OF THE INVENTION

Field of the Invention

The present invention relates to a robot apparatus including a multi-articulated robot and a method for controlling a multi-articulated robot.

Description of the Related Art

In recent years, robot apparatuses that cause multi-articulated robots to perform work such as assembling of workpieces have been increasingly developed. Such robot apparatuses ultimately aim at moving the multi-articulated robots like human hands and cause the multi-articulated robots to perform work such as assembling of complicated workpieces at high speed.

Unfortunately, a multi-articulated robot has a plurality of postures, so-called singular points, at which one position and posture designated in a three-dimensional space cannot be determined as one in a joint space, and the singular points prevent the multi-articulated robot from being intricately moved at high speed. Hence, it is important to appropriately process such singular points in the robot apparatus development.

A block diagram of a general controlling apparatus that controls a multi-articulated robot is illustrated in FIG. 13. In FIG. 13, a current position $C_i$ denotes a position and a posture of a hand tip of a manipulator represented in a three-dimensional space, and a deviation command $V_i$ denotes a deviation of the position and the posture of the hand tip for each control cycle (for example, 2 ms) decided in advance. Because the control cycle is constant, the deviation command $V_i$ represents the speed, and is generated for each control cycle using a teaching pendant and the like.

In such a configuration, a position command calculating unit 150 adds the deviation command $V_i$ to the current position $C_i$ to obtain a next position $C_{i+1}$, and an inverse kinematics calculating unit 155 performs inverse kinematics calculation on the next position $C_{i+1}$ to obtain a next joint angle command $q_{i+1}$. Then, this is transmitted to a servo controlling apparatus 130 that controls joints of the multi-articulated robot, whereby the multi-articulated robot is drive-controlled. However, if the multi-articulated robot is located in the vicinity of a singular point, the joint angle command $q_{i+1}$ significantly changes from the previous joint angle command $q_i$, and the multi-articulated robot may move quickly.

A method of limiting the joint angle command speed is conceivable to deal with the above-mentioned problem. However, if the joint angle command speed is limited, the multi-articulated robot may significantly deviate from the original target position of the hand tip, and a return to the original target position becomes difficult once the multi-articulated robot deviates therefrom. According to a technique disclosed to deal with this problem, if the joint angle speed is excessive, a speed limitation for deceleration is put, whereby the multi-articulated robot is prevented from quick movement in the vicinity of the singular point (Japanese Patent Application Laid-Open No. 2003-300183).

Unfortunately, in the technique disclosed in Japanese Patent Application Laid-Open No. 2003-300183, the joint angle speed is always limited, and hence a motion of the multi-articulated robot becomes slower at a position and a posture other than the singular point.

SUMMARY OF THE INVENTION

According to one aspect of an embodiment, a robot apparatus including: a multi-articulated robot including a plurality of rotational joints; and a controlling apparatus that drive-controls the multi-articulated robot based on an input motion command, wherein the controlling apparatus includes: a joint angle computing unit that computes a joint angle command of each of the plurality of rotational joints, the joint angle command being for driving the multi-articulated robot based on the motion command; a joint drive controlling unit that moves the multi-articulated robot by rotationally driving each of the plurality of rotational joints based on the joint angle command computed by the joint angle computing unit; a singular point calculating unit that calculates one of a singular point angle and a singular point distance of each of the plurality of rotational joints to a singular point of the multi-articulated robot; and a joint speed limiting unit that limits a rotation speed of a rotational joint specified in advance based on a type of the singular point, if one of the singular point angle and the singular point distance calculated by the singular point calculating unit becomes smaller than a predetermined value.

According to another aspect of an embodiment, a robot controlling method for drive-controlling a multi-articulated robot including a plurality of rotational joints, based on an input motion command, the method including: computing, by a controlling unit, a joint angle command of each of the plurality of rotational joints, the joint angle command being for driving the multi-articulated robot based on the motion command; moving, by the controlling unit, the multi-articulated robot by rotationally driving each of the plurality of rotational joints based on the joint angle command computed in the computing the joint angle command; calculating, by the controlling unit, one of a singular point angle and a singular point distance of each of the plurality of rotational joints to a singular point of the multi-articulated robot; and limiting, by the controlling unit, a rotation speed of a rotational joint specified in advance based on a type of singular point, if one of the singular point angle and the calculated singular point distance calculated in the calculating the one of the singular point angle and the singular point distance becomes smaller than a predetermined value.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<First Embodiment>

Figure 1:
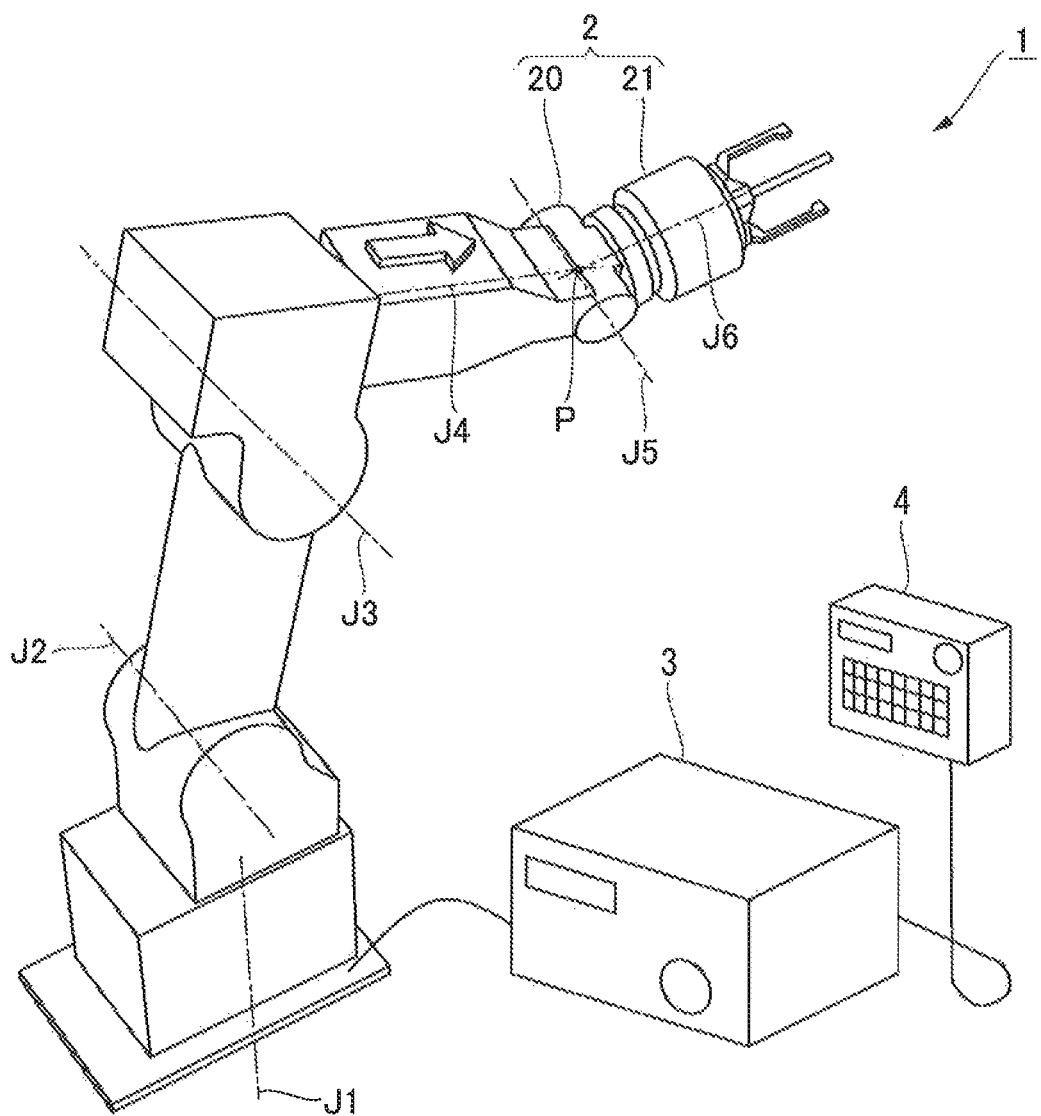
FIG. 1 is a perspective view schematically illustrating an overall structure of a robot apparatus according to a first embodiment of the present invention.

Hereinafter, a robot apparatus according to a first embodiment of the present invention is described with reference to FIG. 1 to FIG. 7. First, a schematic configuration of an entire robot apparatus 1 according to the first embodiment is described with reference to FIG. 1. FIG. 1 is a view schematically illustrating an overall structure of the robot apparatus 1 according to the first embodiment of the present invention.

As illustrated in FIG. 1, the robot apparatus 1 includes: a six-axis vertical multi-articulated robot (hereinafter, referred to as "multi-articulated robot") 2 that performs assembling of workpieces; a controller 3 that controls the multi-articulated robot 2; and a teaching pendant 4 that can be used to operate the multi-articulated robot 2.

The multi-articulated robot (multi-articulated manipulator) 2 includes a six-axis multi-articulated robot arm 20 and an end effector 21 connected to the distal end of the robot arm 20. The robot arm 20 includes six rotational joints (J1 to J6) and six actuators (in the present embodiment, servos) that are rotationally driven about joint axes (a J1 axis to a J6 axis), respectively. The robot arm 20 selectively drives the respective servos of the joints, to thereby move the end effector 21 to a desired three-dimensional position. The end effector 21 is detachably attached to the distal end of the robot arm 20, and is replaceable based on the contents of work. The end effector used in the present embodiment is a so-called hand, which is capable of griping a workpiece with three fingers.

The controller (controlling apparatus) 3 includes: a servo controlling apparatus (see FIG. 5 to be described later) 30 that drive-controls the respective servos of the joints of the robot arm 20; and a joint controlling apparatus (see FIG. 5 to be described later) 31 that controls the joints of the robot arm 20. Moreover, the controller 3 includes an end effector controlling apparatus that controls the end effector 21, a storage unit, a recording medium reading apparatus, and a communication apparatus.

The joint controlling apparatus 31 controls each rotational joint such that the robot arm 20 moves while avoiding a quick movement at a particular rotational joint when the robot arm 20 approaches a singular point. Note that the joint controlling apparatus 31 is described later in detail. The servo controlling apparatus (joint drive controlling unit) 30 rotationally drives the respective servos of the rotational joints based on joint angle commands (to be described later) calculated by the joint controlling apparatus 31, to thereby move the robot arm 20.

The storage unit stores therein a program (robot controlling program) for executing a robot controlling method (to be described later) and data such as singular points of the robot arm 20 and initial teaching points set in advance by a user. The recording medium reading apparatus is used to: read the contents of a computer-readable recording medium that records therein various programs such as the robot controlling program; and store the programs and the data recorded in the recording medium, into the storage unit. The communication apparatus is used to, for example, download an update program distributed via the Internet through the communication apparatus, without using the above-mentioned recording medium.

The teaching pendant (operation unit) 4 is a human-machine interface for the user, and is used by the user to operate the multi-articulated robot 2. Moreover, the teaching pendant 4 has a function called jog operation. In the jog operation, for example, the hand tip position of the multi-articulated robot 2 can be linearly moved in three-dimensional coordinates while the user presses a button. Hence, the multi-articulated robot 2 may approach a singular point during the jog operation, and, if the multi-articulated robot 2 approaches the singular point, a particular joint may move quickly. In the present embodiment, even in the case where the multi-articulated robot 2 approaches the singular point, the joint controlling apparatus 31 enables the robot arm 20 to be driven while the quick movement at the particular joint is avoided.

Figure 2:
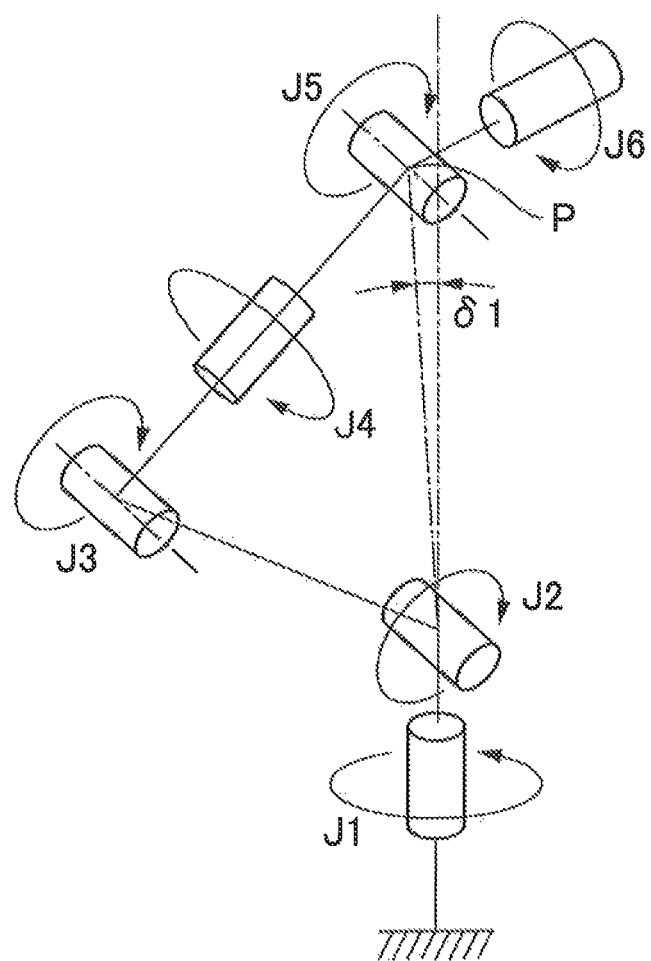
FIG. 2 is an explanatory view for describing a first singular point of a robot arm according to the first embodiment.
Figure 3:
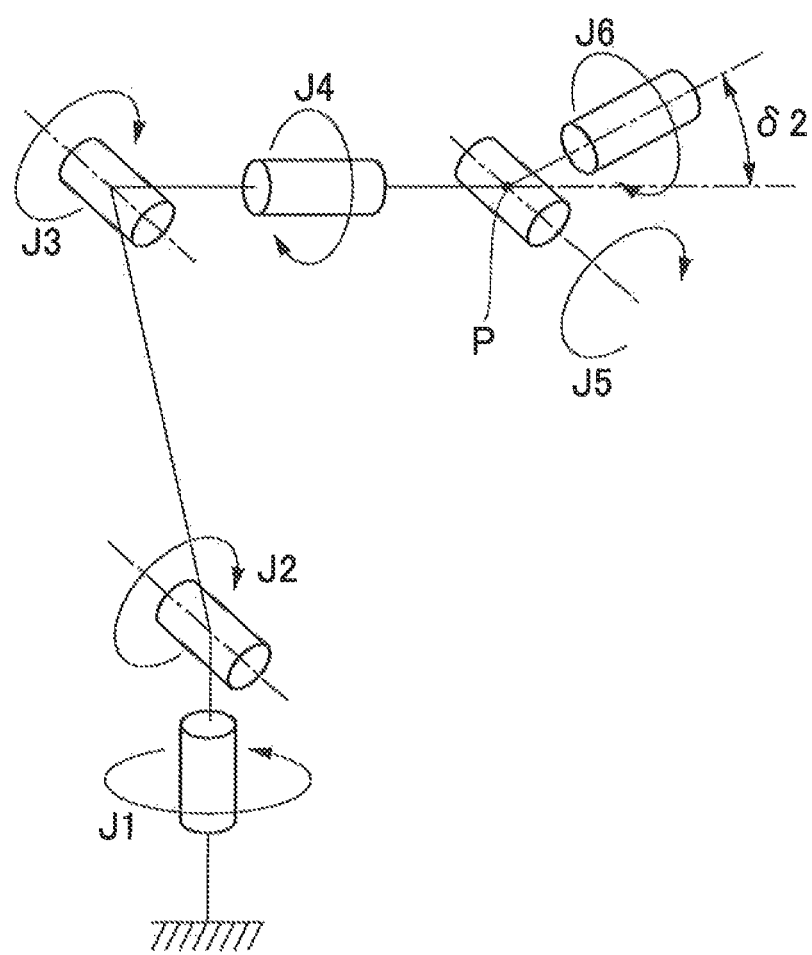
FIG. 3 is an explanatory view for describing a second singular point of the robot arm according to the first embodiment.
Figure 4:
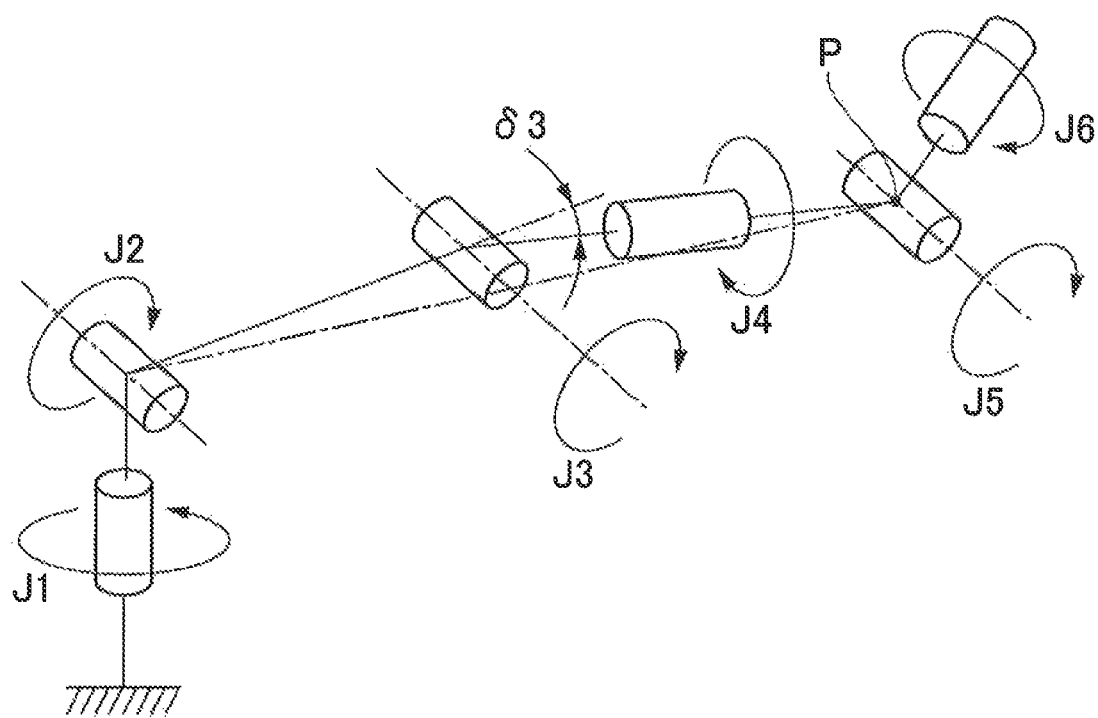
FIG. 4 is an explanatory view for describing a third singular point of the robot arm according to the first embodiment.

Next, the joint controlling apparatus 31 is specifically described with reference to FIG. 2 to FIG. 7. First, singular points and singular point distances of the robot arm 20 are described with reference to FIG. 2 to FIG. 4. FIG. 2 is an explanatory view for describing a first singular point of the robot arm 20 according to the first embodiment. FIG. 3 is an explanatory view for describing a second singular point of the robot arm 20 according to the first embodiment. FIG. 4 is an explanatory view for describing a third singular point of the robot arm 20 according to the first embodiment.

In general, a multi-articulated robot (multi-articulated manipulator) has a large number of singular points at which the joint angle cannot be calculated for a particular hand tip position. For example, it is known that the six-axis multi-articulated robot 2 has three singular points (the first singular point to the third singular point), and the multi-articulated robot 2 may approach the three singular points at the same time. Hereinafter, the three singular points of the multi-articulated robot 2 are described.

Note that, in the following, the J1 axis direction is referred to as vertical direction, and the direction orthogonal to the J1 axis direction is referred to as horizontal direction, for ease of description. Moreover, a general industrial robot is designed such that the J1 axis direction is orthogonal to the J2 axis direction and that the J2 axis direction is parallel to the J3 axis direction, and hence description is given based on this condition. A configuration in which the J2 axis is offset in the horizontal direction with respect to the J1 axis can also be adopted, but can be discussed in a similar manner, and hence description thereof is omitted here. Further, in general, the J4 axis, the J5 axis and the J6 axis are designed in many cases so as to intersect with one another at one point (a point P illustrated in FIG. 2 to FIG. 4) in order to facilitate inverse kinematics calculation, and hence description is given based on this condition.

As illustrated in FIG. 2, the first singular point corresponds to the case where the point at which the J4 axis, the J5 axis and the J6 axis intersect with one another, that is, the point P is located on the J1 axis. At the first singular point, the J1 axis, the J4 axis, the J5 axis and the J6 axis intersect with one another at one point (point P), and hence the rotation angles of the four rotational joints J1 and J4 to J6 are not determined. This is because the rotation angle is determined by three types of directions (variables) in a three-dimensional space, whereas the number of variables is four, which is larger by one than three, at the first singular point. In the vicinity of the first singular point, a slight change in the position and the posture of the hand tip leads to significant changes in angles of the rotational joints J1 and J4 to J6.

Moreover, assuming that a rotation angle of the rotational joint J2 necessary to locate the point P onto the J1 axis is δ1, the rotation angle δ1 is a representative index showing the distance to the first singular point. Hence, in the present embodiment, the rotation angle (hereinafter, referred to as "singular point angle") of a particular rotational joint is used as a singular point distance. Empirically, if the rotation angle (singular point angle) δ1 of the rotational joint J2 falls below 15 degrees, a slight change in the position and the posture of the hand tip significantly changes the rotation angles of the rotational joints J1 and J4 to J6, which requires attention.

As illustrated in FIG. 3, the second singular point corresponds to the case where the J4 axis and the J6 axis intersect the same axis. At the second singular point, the J4 axis and the J6 axis coincide with each other, and hence the rotation angles of the rotational joints J4 and J6 cannot be determined as one. In the vicinity of the second singular point, a slight change in the position and the posture of the hand tip leads to significant changes in angles of the rotational joints J4 and J6. Moreover, assuming that a rotation angle of the rotational joint J5 necessary to locate the J4 axis and the J6 axis onto the same axis is δ2, empirically, if the rotation angle (singular point angle) δ2 falls below 15 degrees, a slight change in the position and the posture of the hand tip significantly changes the rotation angles of the rotational joints J4 and J6, which requires attention.

As illustrated in FIG. 4, the third singular point corresponds to the case where the J2 axis and the J3 axis intersect the J4 axis. At the third singular point, because the J2 axis and the J3 axis intersect the J4 axis, the rotation angles of the rotational joints J2 and J3 cannot be determined. In the vicinity of the third singular point, a slight change in the position and the posture of the hand tip leads to significant changes in angles of the rotational joints J2 and J3. Moreover, assuming that a rotation angle of the rotational joint J3 necessary to locate the J2 axis and the J3 axis onto the J4 axis is δ3, empirically, if the rotation angle (singular point angle) δ3 falls below 15 degrees, a slight change in the position and the posture of the hand tip significantly changes the rotation angles of the rotational joints J2 and J3, which requires attention.

Figure 5:
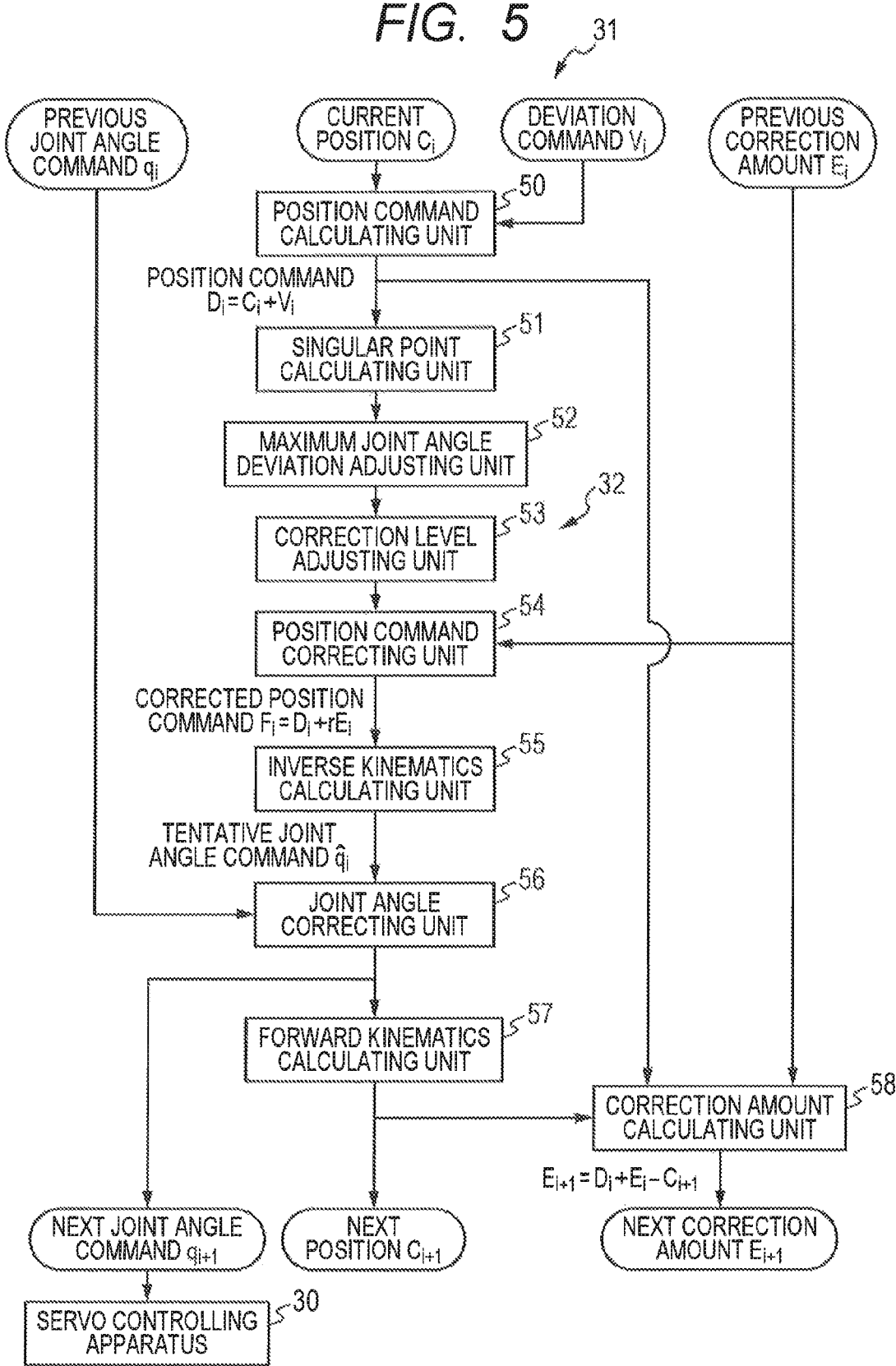
FIG. 5 is a block diagram illustrating a configuration of a joint controlling apparatus according to the first embodiment.

Next, the joint controlling apparatus 31 that can drive-control the robot arm 20 while suppressing a quick movement thereof when the robot arm 20 approaches the three singular points is described with reference to FIG. 5. FIG. 5 is a block diagram illustrating a configuration of the joint controlling apparatus 31 according to the first embodiment.

First, the configuration of the joint controlling apparatus 31 is described. As illustrated in FIG. 5, the joint controlling apparatus 31 includes: a joint angle computing unit 32 that computes a joint angle command of each rotational joint for driving the robot arm 20 based on a motion command; and a singular point calculating unit 51 that calculates the singular point angle of each rotational joint to each singular point. The joint controlling apparatus 31 further includes a maximum joint angle deviation adjusting unit 52 that performs a process of making smaller a limit value of a maximum joint angle deviation (maximum rotation speed) given in advance for each rotational joint, according to the singular point angle.

The joint angle computing unit 32 includes a position command calculating unit 50, a correction level adjusting unit 53, a position command correcting unit 54, an inverse kinematics calculating unit 55, a joint angle correcting unit 56, a forward kinematics calculating unit 57, and a correction amount calculating unit 58.

The position command calculating unit 50 adds a deviation command of the hand tip of the robot arm 20 to a current position of the hand tip thereof expressed by three-dimensional coordinates, to thereby calculate a position command. The correction level adjusting unit 53 performs a process of calculating a correction level (which is a rate of correction and is hereinafter referred to as "correction rate") according to the degree of the singular point angle. Specifically, the correction level adjusting unit 54 performs a process of making the correction rate smaller as the singular point angle is smaller. The position command correcting unit 54 adds the product of a previous correction amount and the correction rate to the position command calculated by the position command calculating unit 50, to thereby calculate a corrected position command. The inverse kinematics calculating unit transforms the position command corrected by the position command correcting unit 54 into a tentative joint angle command. The joint angle correcting unit 56 calculates a joint angle deviation from the tentative joint angle command calculated by the inverse kinematics calculating unit 55 and a previous joint angle command, and makes the tentative joint angle command smaller such that the joint angle deviation does not exceed the maximum joint angle deviation calculated by the maximum joint angle deviation adjusting unit 52, to thereby calculate a next joint angle command. The forward kinematics calculating unit 57 calculates a next joint angle command and a next position from the modified joint angle command. The correction amount calculating unit 58 adds a correction amount to the difference between the next position calculated by the forward kinematics calculating unit 57 and the position command, to thereby calculate a next correction amount.

The maximum joint angle deviation adjusting unit (joint speed limiting unit) 52 makes the limit value of the maximum joint angle deviation (maximum rotation speed) smaller than the limit value of a preset maximum joint angle deviation, if the singular point angle of a rotational joint specified in advance based on the singular point type becomes smaller than a predetermined value.

Figures 6, 7:
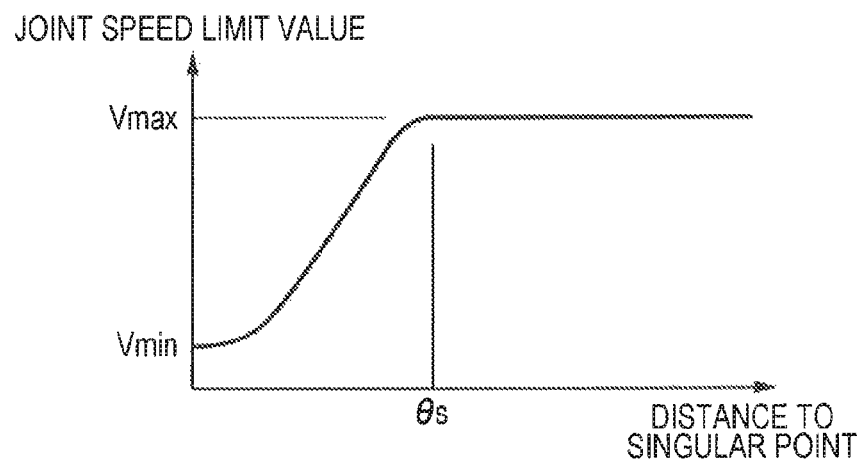
FIG. 6 is an explanatory view for describing a function for calculating a maximum joint angle deviation.
FIG. 7 is an explanatory view for describing joint axes to be subjected to speed limitation according to each singular point type.

Next, the drive-control (robot controlling method) of the robot arm 20 by the joint controlling apparatus 31 configured as described above is described with reference to FIG. 6 and FIG. 7 in addition to FIG. 5. Note that a subscript i of each symbol given blow represents the number of times of calculation, and is incremented by one each time a series of calculation is ended. Moreover, this calculation is performed for each control cycle, for example, 2 ms. FIG. 6 is an explanatory view for describing a function for calculating the maximum joint angle deviation. FIG. 7 is an explanatory view for describing joint axis to be subjected to speed limitation according to each singular point type.

If a motion command is input to the teaching pendant 4, a deviation command $V_i$, a current position $C_i$, a previous correction amount $E_i$ and a previous joint angle command $q_i$ are input from the teaching pendant 4 to the joint controlling apparatus 31, based on the input motion command. Consequently, the joint controlling apparatus 31 calculates a next joint angle command $q_{i+1}$, a next position $C_{i+1}$ and a next correction amount $E_{i+1}$ based on the input data, and outputs the calculation results to the servo controlling apparatus 30. The servo controlling apparatus 30 rotationally drives the rotational joints based on the input data, to thereby move the robot arm 20. Hereinafter, a method of calculating the next joint angle commands $q_{i+1}$, the next position $C_{i+1}$ and the next correction amount $E_{i+1}$ by the joint controlling apparatus 31 is specifically described.

If the deviation command $V_i$, the current position $C_i$, the previous correction amount $E_i$ and the previous joint angle command $q_i$ are input from the teaching pendant 4, first, the joint controlling apparatus 31 adds the deviation command $V_i$ of the hand tip and the current position $C_i$ of the hand tip, to thereby calculate a position command $D_i$ (position command calculating step). Here, current position data and deviation command data are vectors having six components made of movements and rotations in the X, Y, and Z directions, and represent a position and a posture. Another method of representing such a position and a posture involves using a 4×4 homogeneous coordinate transformation matrix. In this method, the sum of the vectors is expressed by matrix multiplication. This is different in only how to express the position and the posture, and is irrelevant to the gist of the present invention. Hence, in the present embodiment, vector expression that is easy to understand intuitively is used to express the position and the posture.

Subsequently, the joint controlling apparatus 31 calculates a singular point angle, and determines whether or not the robot arm 20 is in the vicinity of a singular point (singular point calculating step). In the present embodiment, the joint controlling apparatus 31 calculates the singular point angle of a corresponding rotational joint according to the three types of singular points. Note that the current joint angle can be used as a substitute for the singular point angle of the corresponding rotational joint. This is because the control cycle of the multi-articulated robot 2 according to the present embodiment is 2 ms, which is a sufficiently short time, and a change in joint angle is also small.

After the calculation of the singular point angle, the joint controlling apparatus 31 then performs the process of making smaller the limit value of the maximum joint angle deviation (maximum rotation speed) given in advance for each rotational joint, according to the singular point angle (joint speed adjusting step). Here, the maximum rotation speed, that is, the limit value of the maximum joint angle deviation is determined for each rotational joint, based on restrictions of torque generated by a motor and the maximum rotation speed that can be dealt with by an encoder. In this case, the limit value thereof is made further smaller according to the singular point angle.

For example, as illustrated in FIG. 6, it is assumed that a maximum rotation angle deviation (maximum rotation speed) given for each rotational joint is $V_{max}$, that a rotation angle deviation when the singular point angle is zero is $V_{min}$, and that an angle for determining the vicinity of the singular point is $\theta_s$. A decelerated maximum rotation angle deviation $V_{lim}$ to a singular point angle $\theta$ is calculated according to the following expression.

$$V_{lim} = (V_{max} - V_{min})\left(-2\left(\frac{\theta}{\theta_s}\right)^3 + 3\left(\frac{\theta}{\theta_s}\right)^2\right) + V_{min} \quad \theta \le \theta_s$$
$$V_{lim} = V_{max} \quad \theta > \theta_s$$

[Expression 1]

In the case where the angle $\theta_s$ for determining the vicinity of the singular point is set to, for example, 15 degrees, if the singular point angle falls below 15 degrees, the rotation speed of a particular rotational joint is limited. Moreover, the process of making the limit value smaller is performed for each rotational joint specified in advance based on the singular point type. For example, as illustrated in FIG. 7, in the case of the first singular point, the limit values of the maximum joint angle deviations (maximum rotation speeds) of the rotational joints J1, J4, J5 and J6 are made smaller. Note that the minimum value of each limit value at this time is set to zero. Moreover, in the case of the second singular point, the limit values of the maximum joint angle deviations (maximum rotation speeds) of the rotational joints J4 and J6 are made smaller. Note that the minimum value of each limit value at this time is set to zero. Further, in the case of the third singular point, the limit values of the maximum joint angle deviations (maximum rotation speeds) of the rotational joints J2 and J3 are made smaller. Note that the minimum value of each limit value at this time is set to not zero but, for example, a low speed such as one degree per second. This is because, if this speed is set to zero, an escape from the third singular point is impossible.

Moreover, the robot arm 20 may approach the first singular point to the third singular point at the same time. For example, in the case where the robot arm 20 approaches the first singular point and the second singular point at the same time, the joint controlling apparatus 31 calculates the maximum joint angle deviations (maximum rotation speeds) of the rotational joints, and defines the smallest one as a limit value.

Subsequently, the joint controlling apparatus 31 calculates a correction rate according to the singular point angle (correction level adjusting step). As described above, there are three singular points, and there are singular point angles corresponding to the three singular points. Here, the minimum value of the singular point angles is regarded as the singular point angle. Moreover, the correction rate is any number from 0 to 1. The correction rate is zero in the vicinity of the singular point, and is 1 at a position away from the singular point. For example, assuming that a singular point angle for determining the vicinity of the singular point is $\theta_s$ and that the smallest one of the singular point angles to the three types of singular points is $\theta$, a correction rate r can be represented by the following expression.

$$r = -2\left(\frac{\theta}{\theta_s}\right)^3 + 3\left(\frac{\theta}{\theta_s}\right)^2 \quad \theta \le \theta_s$$
$$r = 1 \quad \theta > \theta_s$$

[Expression 2]

Note that the form of this function is the same as the case where $V_{max}=1$ and $V_{min}=0$ in FIG. 6, and hence description thereof is omitted. Moreover, the singular point angle $\theta_s$ is set to, for example, 15 degrees.

Subsequently, the joint controlling apparatus 31 adds the product of the previous correction amount $E_i$ and the correction rate r to the position command $D_i$ calculated in the position command calculating step, to thereby calculate a corrected position command $F_i$ (position command correcting step).

$$F_i = D_i + rE_i \quad \text{[Expression 3]}$$

As a result of the correction level adjusting step, the correction rate becomes smaller in the vicinity of the singular point. Hence, if the previous correction amount is multiplied by the correction rate, the correction amount becomes smaller in the vicinity of the singular point. Hence, according to conventional techniques, if the correction amount becomes larger in the vicinity of the singular point, motions of the joints may become unstable. In comparison, in the present embodiment, the correction amount becomes smaller in the vicinity of the singular point, and hence motions of the joints can be made stable.

Subsequently, the joint controlling apparatus 31 transforms the position command $F_i$ corrected in the position command correcting step into a tentative joint angle command $$\hat{q}_i \quad \text{[Expression 4]}$$

(inverse kinematics calculating step). Subsequently, the joint controlling apparatus 31 calculates a joint angle deviation from the tentative joint angle command $$\hat{q}_i \quad \text{[Expression 5]}$$

and the previous joint angle command $q_i$, and makes the tentative joint angle command smaller such that the joint angle deviation does not exceed the maximum rotation angle deviation $V_{lim}$ calculated in the maximum joint angle deviation adjusting step, to thereby calculate the next joint angle command $q_{i+1}$ (joint angle correcting step). Here, the following expression needs to be established from such a condition that the joint angle deviation does not exceed the upper limit thereof.

$$q_i - V_{lim} \leq q_{i+1} \leq q_i + V_{lim} \quad \text{[Expression 6]}$$

The joint controlling apparatus 31 calculates the next joint angle command $q_{i+1}$ according to the following expression such that Expression 6 is satisfied.

$$q_{i+1} = \hat{q}_i \text{ if } q_i - V_{lim} \leq \hat{q}_i \leq q_i + V_{lim}$$

$$q_{i+1} q_i - V_{lim} \text{ if } \hat{q}_i < q_i - V_{lim}$$

$$q_{i+1} = q_i + V_{lim} \text{ if } q_i + V_{lim} < \hat{q}_i \quad \text{[Expression 7]}$$

After the calculation of the next joint angle command $q_{i+1}$, the joint controlling apparatus 31 calculates the next position $C_{i+1}$ from the next joint angle command $q_{i+1}$ (forward kinematics calculating step). Subsequently, the joint controlling apparatus 31 adds the correction amount $E_i$ to the difference between the next position $C_{i+1}$ calculated in the forward kinematics calculating step and the position command $D_{i+1}$, to thereby calculate the next correction amount $E_{i+1}$ (correction amount calculating step).

$$E_{i+1} = D_i + E_i - C_{i+1} \quad \text{[Expression 8]}$$

Here, if the robot arm 20 is not in the vicinity of the singular point, the correction rate is 1, and hence the corrected position command is represented by the following expression.

$$F_i = D_i + E_i \quad \text{[Expression 9]}$$

Moreover, because deceleration is not performed in the joint angle correcting step, it returns to the foregoing value, $C_{i+1} = D_i + E_i$ through the inverse kinematics calculating step and the forward kinematics calculating step. If this $C_{i+1}$ is substituted into Expression 8, $E_{i+1}$ becomes zero. That is, if the robot arm comes away from the singular point, the correction amount becomes zero.

As described above, the robot apparatus 1 according to the first embodiment calculates the singular point angle (distance), adjusts the maximum joint angle deviation according to the singular point angle, and corrects the joint angle deviation such that the joint angle deviation is equal to or less than the maximum value thereof. Hence, for example, if the maximum joint angle deviation is set to be small in the vicinity of the singular point and is set to be large in the other areas, the problem that the motion of the multi-articulated robot becomes slower in the other areas than the singular point can be solved. As a result, the motion speed of the multi-articulated robot can be enhanced. Moreover, in the vicinity of the singular point, the maximum joint angle deviation, that is, the joint angle speed is limited for each rotational joint specified based on the singular point type, and hence a quick movement of the robot arm can be prevented.

Moreover, if the joint angle deviation is modified, the position of the hand tip deviates from the original target position, so that the position of the hand tip needs to be corrected. In conventional techniques, the hand tip position is corrected even in the vicinity of the singular point, and hence a significant change in joint speed occurs. In comparison, in the present embodiment, the singular point angle is calculated, the correction rate is adjusted accordingly, and the position command is corrected in consideration of the correction rate. For example, the correction rate is set to be small in the vicinity of the singular point, and is set to be large in the other areas. As a result, the correction amount becomes smaller in the vicinity of the singular point, and hence the joint speed can be prevented from increasing. Moreover, the multi-articulated robot 2 can be prevented from being stopped in order to avoid the joint speed from increasing, and hence the productivity can be enhanced. Moreover, if the robot arm 20 comes away from the singular point, the correction level becomes larger, and hence the position of the hand tip can follow the original target position.

Moreover, the robot apparatus 1 according to the first embodiment calculates the singular point angle for each singular point type, and thus can limit a different joint angle deviation, that is, the rotation speed of a different rotational joint for each singular point type. Hence, a prompt escape from the singular point is possible with the use of a rotational joint that is not decelerated even in the vicinity of the singular point.

Moreover, the robot apparatus 1 according to the first embodiment can make the correction amount smaller according to the smallest one of the singular point angles. Hence, calculation is stable even in the vicinity of the singular point, and the hand tip speed does not need to be decelerated, resulting in enhancement of the motion speed.

<Second Embodiment>

Figure 8:
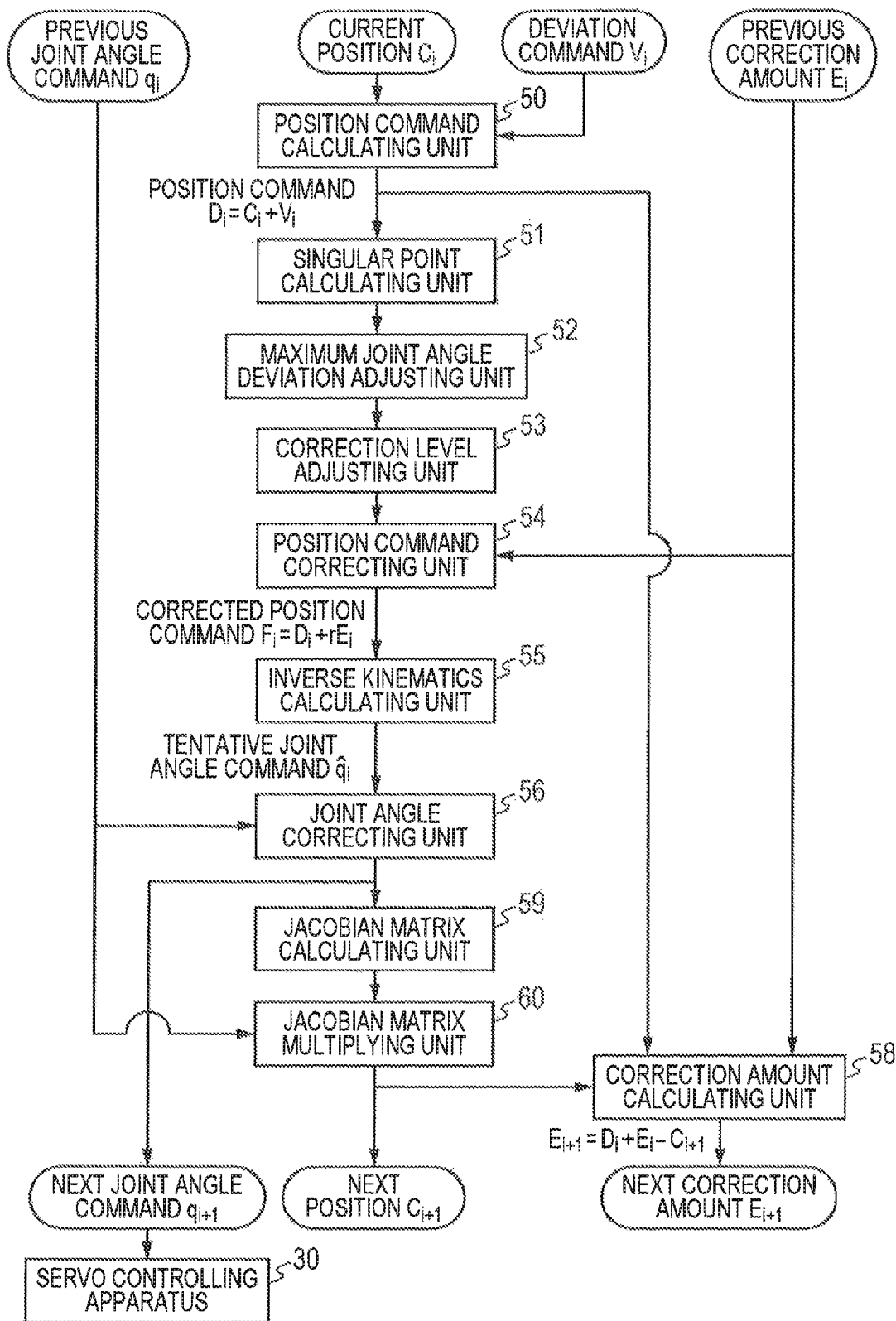
FIG. 8 is a block diagram illustrating a configuration of a joint controlling apparatus according to a second embodiment.

Next, a robot apparatus according to a second embodiment is described with reference to FIG. 8. The second embodiment is different from the first embodiment in that the forward kinematics calculating unit 57 of the joint controlling apparatus 31 is replaced with a Jacobian matrix calculating unit 59 and a Jacobian matrix multiplying unit 60. Hence, in the second embodiment, the Jacobian matrix calculating unit 59 and the Jacobian matrix multiplying unit 60 are described. FIG. 8 is a block diagram illustrating a configuration of a joint controlling apparatus 31A according to the second embodiment.

In forward kinematics calculation, the position and the posture is sequentially calculated from the joint at the root, whereby the position and the posture of the hand tip is calculated. Then, it is known that the position and the posture of the hand tip can be approximately calculated by multiplication using a Jacobian matrix. The Jacobian matrix calculating unit 59 calculates such a Jacobian matrix. In the case of the six-axis multi-articulated robot arm 20, the Jacobian matrix is a 6×6 matrix, and, if this matrix is multiplied by a deviation vector of the joint angle (joint speed), a deviation vector at the hand tip position (hand tip speed) is obtained.

The Jacobian matrix multiplying unit 60 multiplies the Jacobian matrix by the difference between the joint angle command calculated in the joint angle correcting step and the previous joint angle command, that is, multiplies the Jacobian matrix by the deviation vector of the joint angle, and adds the current position to the obtained product, to thereby calculate the next position. For example, the next position can be calculated according to the following expression.

$$C_{i+1} = C_i + J(q_{i+1} - q_i) \qquad \text{[Expression 10]}$$

According to the second embodiment, because the forward kinematics calculation is complicated coordinate transformation including a trigonometric function, the Jacobian matrix calculating unit 59 and the Jacobian matrix multiplying unit 60 are used as substitutes for the forward kinematics calculating unit 57, whereby the amount of calculation can be reduced.

<Third Embodiment>

Figure 9:
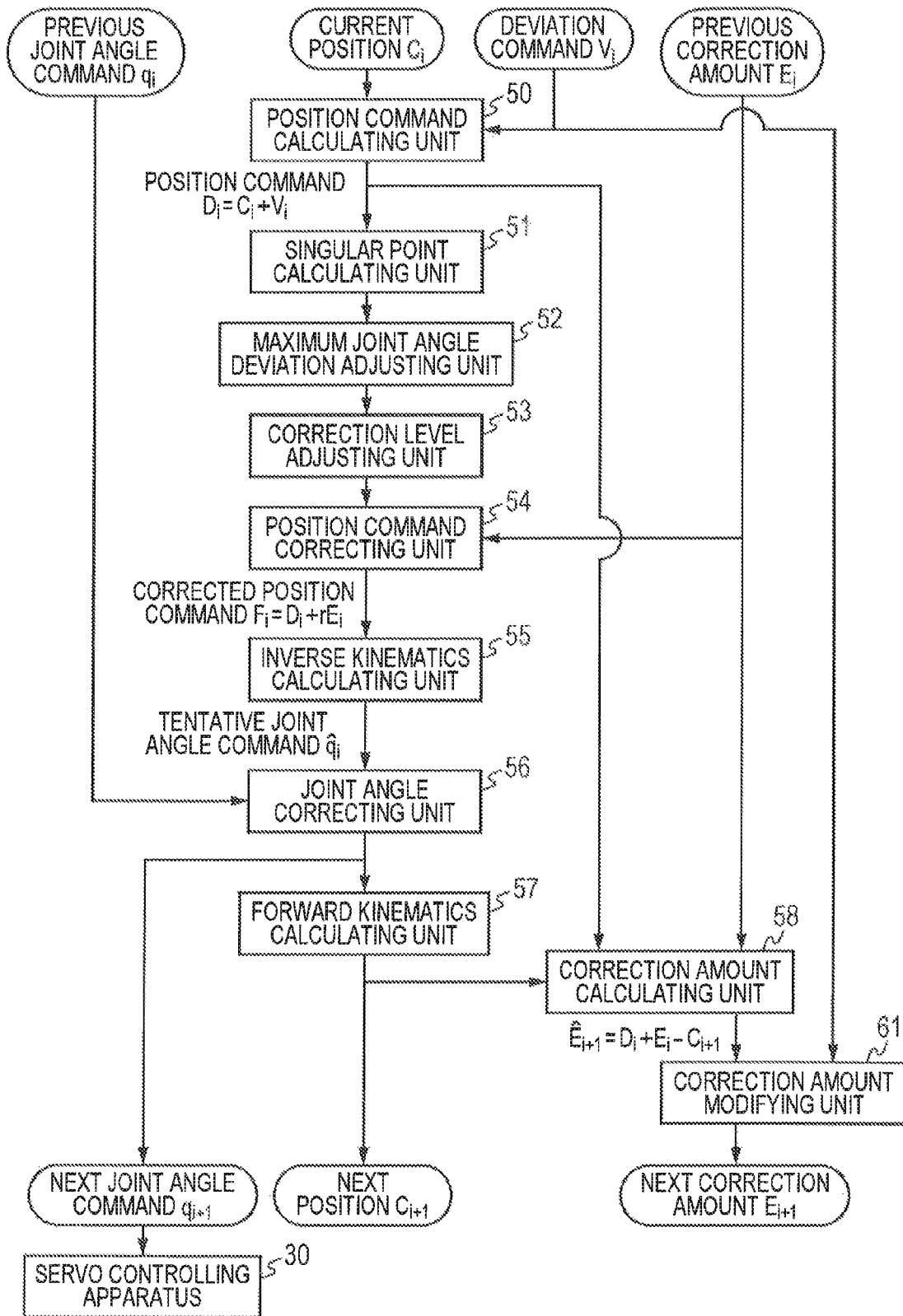
FIG. 9 is a block diagram illustrating a configuration of a joint controlling apparatus according to a third embodiment.

Next, a robot apparatus according to a third embodiment is described with reference to FIG. 9. The third embodiment is different from the first embodiment in that a correction amount modifying unit 61 is added to make the correction amount smaller. Hence, in the third embodiment, the correction amount modifying unit 61 is described. FIG. 9 is a block diagram illustrating a configuration of a joint controlling apparatus 31B according to the third embodiment.

Here, assumed is a scene where an operator presses a button of the teaching pendant 4 and moves the hand tip position (end effector 21) of the multi-articulated robot 2. The deviation command continues to output a number other than zero, while the button of the teaching pendant 4 is pressed. If the robot arm 20 continues to move and approaches a singular point, the hand tip speed is decreased by the speed limitations of the rotational joints, and an amount corresponding to the limited motion at this time is accumulated in the correction amount. Then, if the robot arm 20 comes away from the singular point, the correction amount is reduced in turn, and hence the hand tip speed increases. For example, if the correction amount returns to zero, the hand tip speed also returns to the original speed thereof.

Considering the above-mentioned series of motion, the speed of the robot arm 20 unexpectedly increases at the moment at which the robot arm 20 comes away from the vicinity of the singular point, and it is preferable not to accumulate the correction amount in the direction of a motion desired by an operator. In the third embodiment, the correction amount modifying unit 61 that removes a directional component of the deviation command is provided, and the correction amount modifying unit 61 performs the following vector calculation. First, the correction amount modifying unit 61 calculates a directional vector $v_i$ of the deviation command $V_i$.

$$v_i = \frac{V_i}{|V_i|} \qquad \text{[Expression 11]}$$

Subsequently, the correction amount modifying unit 61 calculates the modified correction amount $E_{i+1}$ from an unmodified correction amount $$\hat{E}_{i+1} \qquad \text{[Expression 12]}$$

and the directional vector $v_i$.

$$E_{i+1} = \hat{E}_{i+1} - (\hat{E}_{i+1} \cdot v_i) v_i \qquad \text{[Expression 13]}$$

Expression 13 means that the directional component of the deviation command is removed from the correction amount. According to the third embodiment, the correction amount can be made smaller, and hence an unnecessary increase in speed at the moment at which the robot arm 20 comes away from the vicinity of the singular point can be suppressed. Particularly from a standpoint of an operator of the teaching pendant, an increase in speed in a direction desired by the operator, that is, the direction of the deviation command can be suppressed. Moreover, because the correction amount becomes smaller, correction calculation in the vicinity of the singular point becomes more stable. Further, because the correction amount becomes smaller, the time required to return to an original target position can be shortened.

<Fourth Embodiment>

Figure 10:
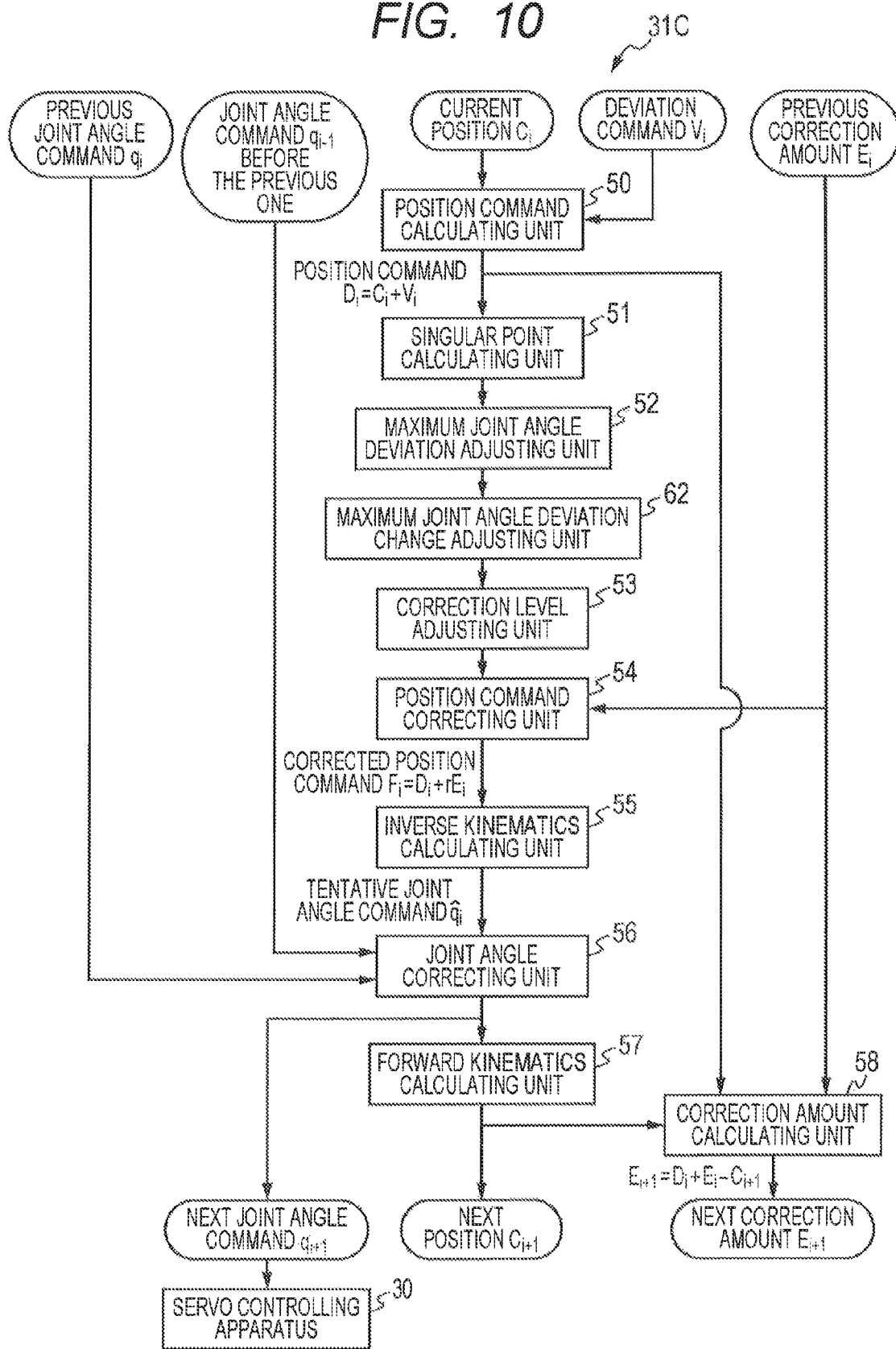
FIG. 10 is a block diagram illustrating a configuration of a joint controlling apparatus according to a fourth embodiment.

Next, a robot apparatus according to a fourth embodiment is described with reference to FIG. 10. The fourth embodiment is different from the first embodiment in that a maximum joint angle deviation change adjusting unit that also limits a deviation change in addition to a limitation of the maximum joint angle deviation is provided. Hence, in the fourth embodiment, the maximum joint angle deviation change adjusting unit 62 is described. FIG. 10 is a block diagram illustrating a configuration of a joint controlling apparatus 31C according to the fourth embodiment.

The maximum joint angle deviation change adjusting unit 62 makes smaller a maximum joint angle deviation change (maximum rotation speed change) given in advance for each rotational joint, according to the singular point angle. Because the control cycle is constant, a joint angle deviation change is acceleration, and the maximum value thereof is determined for each rotational joint based on conditions of torque generable by the motor of each rotational joint and the like. Here, the limit value of the joint angle deviation change is made further smaller for deceleration, according to the singular point angle. A specific method for the deceleration is the same as the method that is described with reference to FIG. 6 in the case of the deviation (rotation speed).

It is assumed that a maximum rotation angle deviation change given for each rotational joint is $A_{max}$, that a joint angle deviation change when the singular point angle $\theta$ of the abscissa axis is zero is $A_{min}$, and that a singular point angle for determining the vicinity of the singular point is $\theta_s$. A decelerated maximum rotation angle deviation change $A_{lim}$ to the singular point angle $\theta$ is calculated according to the following expression.

[Expression 14]

$$A_{lim} = (A_{max} - A_{min})\left(-2\left(\frac{\theta}{\theta_s}\right)^3 + 3\left(\frac{\theta}{\theta_s}\right)^2\right) + A_{min} \quad \theta \leq \theta_s$$

$$A_{lim} = A_{max} \quad \theta > \theta_s$$

For example, in the case where the singular point angle θs is set to 15 degrees, if the singular point angle falls below 15 degrees, the rotation speed of the rotational joint becomes high. In the fourth embodiment, the maximum joint angle deviation change is also limited in addition to the maximum joint angle deviation. The deviation change is calculated from the next joint angle command $q_{i+1}$, the previous joint angle command $q_i$ and a joint angle command $q_{i-1}$ before the previous one according to the following expression.

$$q_{i+1} + q_{i-1} - 2q_i \quad \text{[Expression 15]}$$

Under the condition that Expression 15 does not exceed the limit value calculated by the maximum joint angle deviation change adjusting unit 62, the next joint angle command $q_{i+1}$ is calculated according to Expression 17 so as to satisfy Expression 16.

$$2q_i - q_{i-1} - A_{lim} \leq q_{i+1} \leq 2q_i - q_{i-1} + A_{lim} \quad \text{[Expression 16]}$$

$$q_{i+1} = \hat{q}_i \text{ if } 2q_i - q_{i-1} - A_{lim} \leq \hat{q}_i \leq 2q_i - q_{i-1} + A_{lim}$$

$$q_{i+1} = 2q_i - q_{i-1} - A_{lim} \text{ if } \hat{q}_i < 2q_i - q_{i-1} - A_{lim}$$

$$q_{i+1} = 2q_i - q_{i-1} + A_{lim} \text{ if } 2q_i - q_{i-1} + A_{lim} < \hat{q}_i \quad \text{[Expression 17]}$$

The limitation of the maximum joint angle deviation is further put. This is the same as the joint angle correcting step in the first embodiment, and hence description thereof is omitted. Note that, with regard to the order of priority of the above-mentioned two types of limitations, in the fourth embodiment, the limitation of the maximum joint angle deviation is calculated after the limitation of the deviation change, and hence a higher priority is put on the limitation of the maximum joint angle deviation. According to the fourth embodiment, the maximum joint angle deviation change is also limited in addition to the maximum joint angle deviation, and hence smoother speed control is possible.

<Fifth Embodiment>

Figure 11:
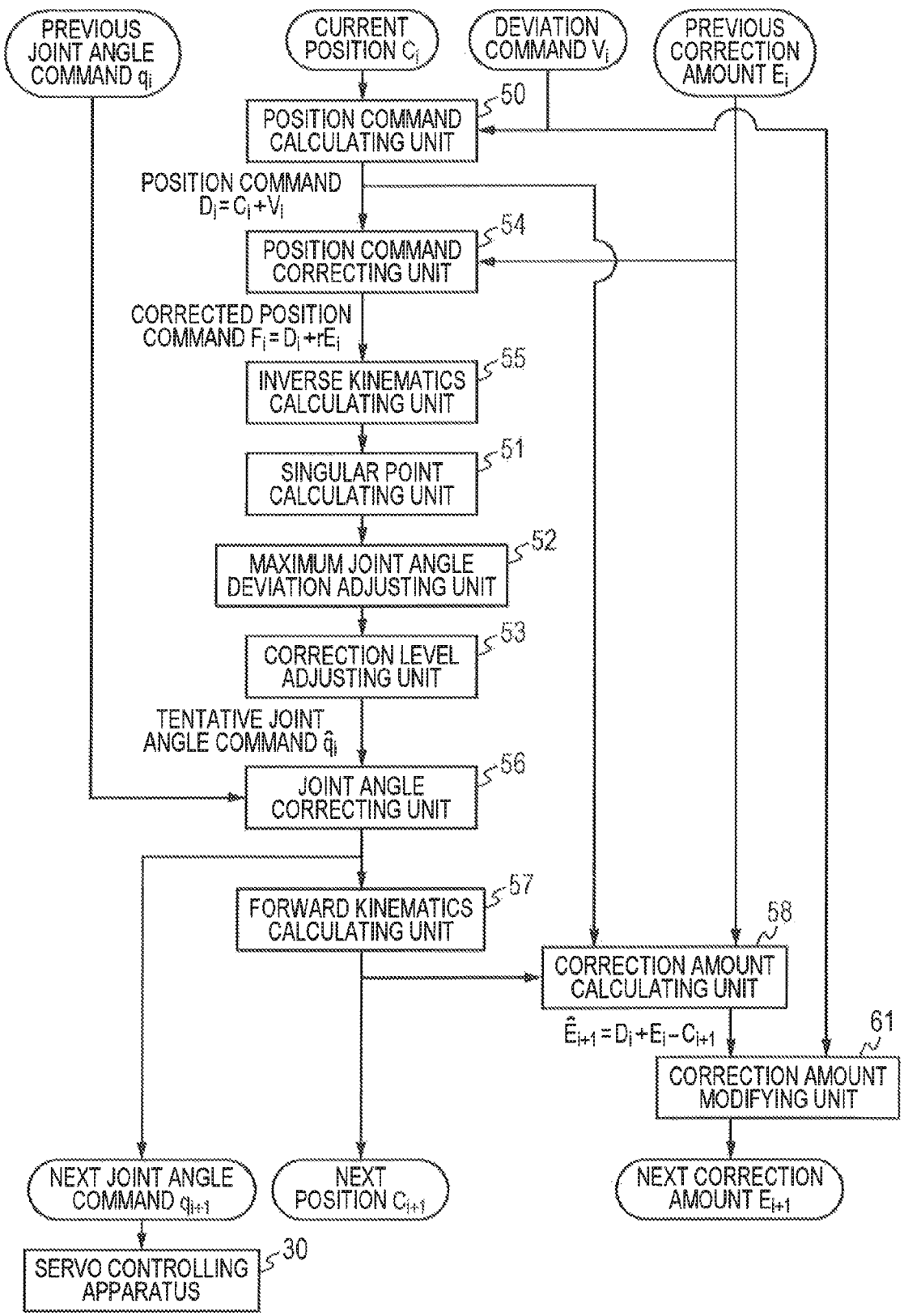
FIG. 11 is a block diagram illustrating a configuration of a joint controlling apparatus according to a fifth embodiment.

Next, a robot apparatus according to a fifth embodiment is described with reference to FIG. 11. The fifth embodiment is different from the first embodiment in that the position command correcting step and the inverse kinematics calculating step are performed before the singular point calculating step. Hence, in the fifth embodiment, the case where the position command correcting step and the inverse kinematics calculating step are performed before the singular point calculating step is described. FIG. 11 is a block diagram illustrating a configuration of a joint controlling apparatus 31D according to the fifth embodiment.

The singular point angle can also be obtained through inverse kinematics calculation. Hence, if the singular point angle is calculated after this calculation, the singular point angle can be calculated using the latest joint angle. In the fifth embodiment, in the position command correcting step, the corrected position command $F_i$ is calculated using a previous correction rate $r_i$.

$$F_i = D_i + r_i E_i \quad \text{[Expression 18]}$$

Note that there is no problem in using the previous correction rate, because the control cycle is 2 ms, which is a sufficiently short time. The reason for this is as follows: because a change in joint angle for 2 ms is small, a change in singular point angle is also small, and a change in correction rate is also small. The fifth embodiment can produce effects similar to effects of the first embodiment.

<Sixth Embodiment>

Figure 12:
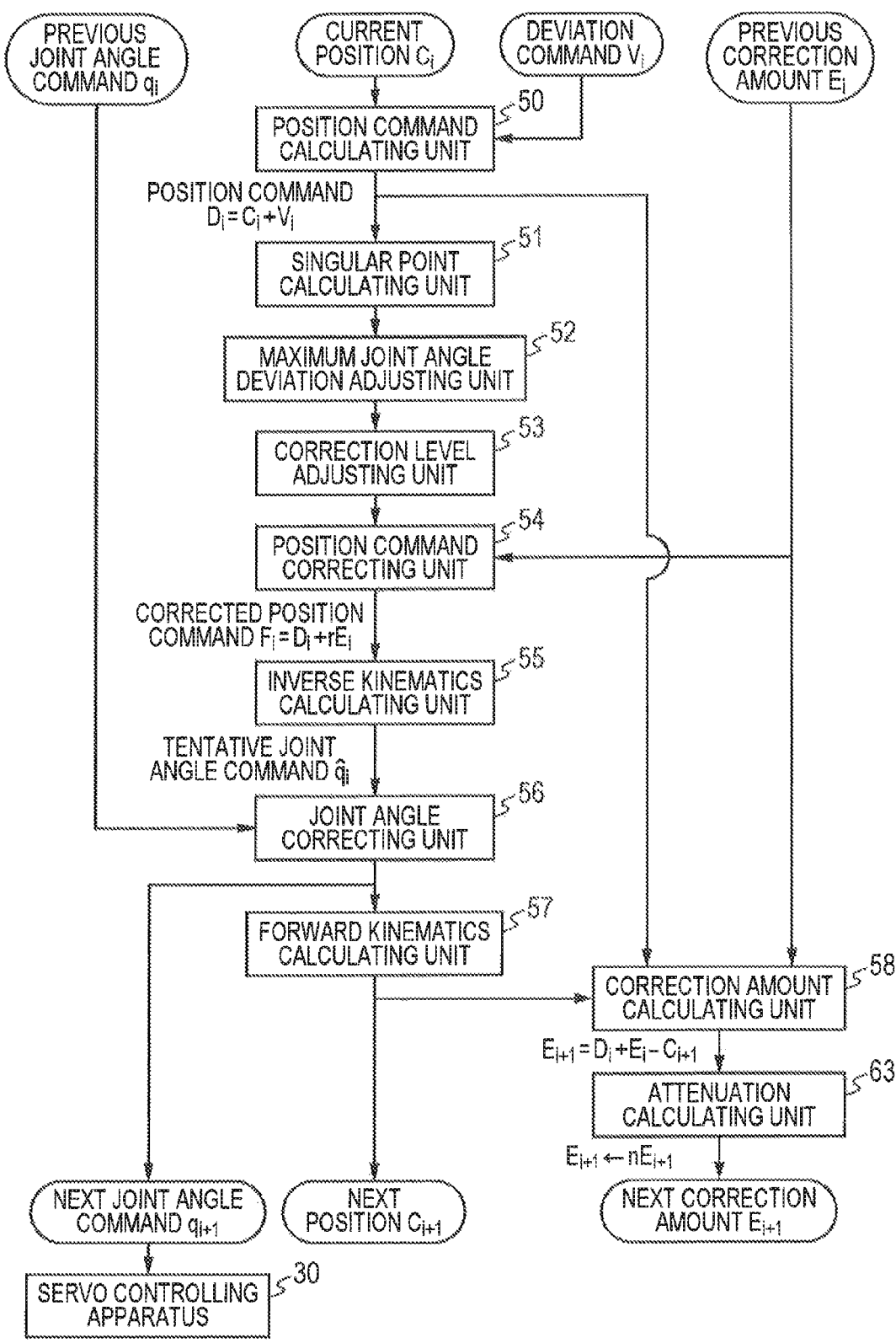
FIG. 12 is a block diagram illustrating a configuration of a joint controlling apparatus according to a sixth embodiment.
Figure 13:
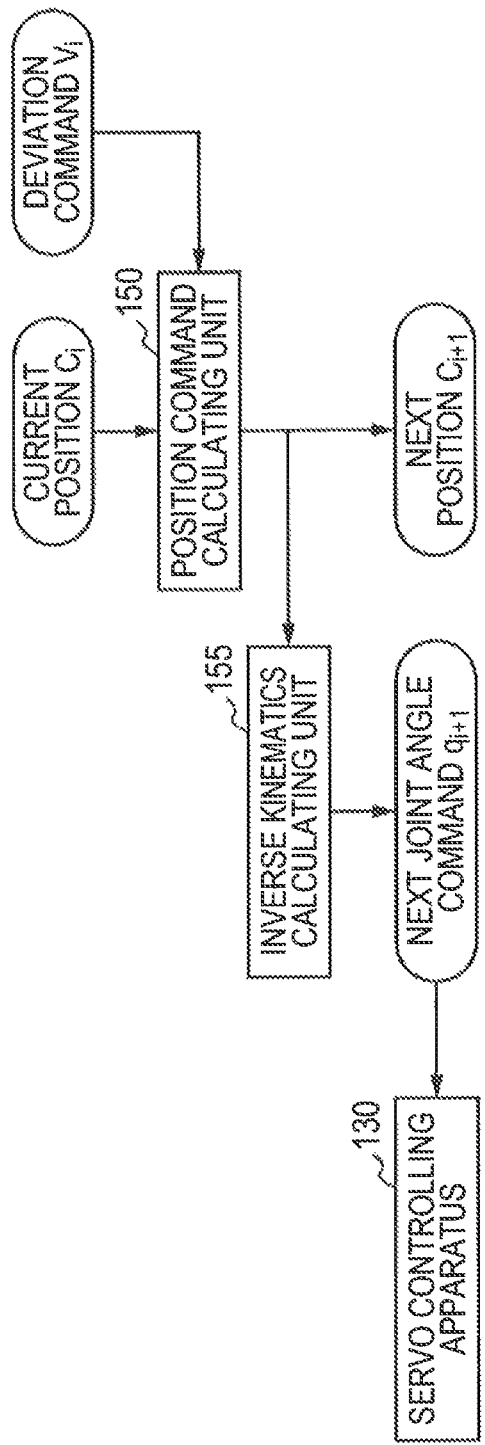
FIG. 13 is a block diagram of a controlling apparatus that controls a multi-articulated robot according to a conventional technique.

Next, a robot apparatus according to a sixth embodiment is described with reference to FIG. 12. The sixth embodiment is different from the first embodiment in that an attenuation calculating step is provided after the correction amount calculating step. Hence, in the sixth embodiment, an attenuation calculating unit 63 that performs the attenuation calculating step is described. FIG. 12 is a block diagram illustrating a configuration of a joint controlling apparatus 31E according to the sixth embodiment.

In the first embodiment, the correction rate is small in the vicinity of the singular point, and becomes larger as the robot arm 20 comes away from the singular point. Here, the case where the robot arm 20 stays in the vicinity of the singular point for a long time and then comes away therefrom is discussed. In this case, correction is applied to the correction amount before such a long-time stay, and the robot arm 20 moves. For example, in the case where an operator of the multi-articulated robot 2 gives a deviation command, movement of the robot arm 20 after the passage of a long time is not favorable to the operator. In this case, it is natural that the correction amount is attenuated with time.

In view of the above, in the sixth embodiment, the attenuation calculating unit 63 performs attenuation calculation of the correction amount at a predetermined rate. Specifically, the attenuation calculating unit 63 substitutes $nE_{i+1}$ into the modified correction amount $E_{i+1}$. In the case where the correction amount is halved through n-time attenuation, the rate is $n=0.5^{(1/n)}$. For example, in the case where the correction amount is halved through attenuation in a control cycle of 2 ms for 4 seconds, the number of times n is $4/0.002=2,000$ times, and the rate is $n=0.999653$.

Hereinabove, the embodiments of the present invention have been described, and the present invention is not limited to the above-mentioned embodiments. Moreover, the effects described in the embodiments of the present invention are mere exemplary effects produced by the present invention, and effects of the present invention are not limited to the effects described in the embodiments of the present invention.

For example, in the first embodiment, the current position is described as $C_i$ calculated using the previous control cycle. Alternatively, the servo controlling apparatus may calculate an actual rotation angle, and may obtain the current position through forward kinematics calculation. Even in this case, the gist of the present invention is maintained, and the same effects are obtained.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-162891, filed Aug. 6, 2013, which is hereby incorporated by reference herein in its entirety.

What is claimed is:

1. A robot apparatus comprising:
a multi-articulated robot including a plurality of rotational joints; and
a controlling apparatus that drive-controls the multi-articulated robot based on an input motion command, wherein
the controlling apparatus includes:
a joint angle computing unit that computes a joint angle command of each of the plurality of rotational joints, the joint angle command being for driving the multi-articulated robot based on the motion command;
a joint drive controlling unit that moves the multi-articulated robot by rotationally driving each of the plurality of rotational joints based on the joint angle command computed by the joint angle computing unit;
a singular point calculating unit that calculates one of a singular point angle and a singular point distance of each of the plurality of rotational joints to a singular point of the multi-articulated robot; and
a joint speed limiting unit that limits a rotation speed of a rotational joint specified in advance based on a type of the singular point when the one of the singular point angle and the singular point distance calculated by the singular point calculating unit becomes smaller than a predetermined value,
wherein the joint angle computing unit includes:
a position command calculating unit that calculates a position command based on the motion command;
a correction level adjusting unit that calculates a correction rate that is a rate of correction according to the one of the singular point angle and the singular point distance calculated by the singular point calculating unit;
a position command correcting unit that corrects the position command by adding a product of a previous correction amount and the correction rate calculated by the correction level adjusting unit to the position command;
an inverse kinematics calculating unit that transforms the position command corrected by the position command correcting unit into a tentative joint angle command;
a joint angle correcting unit that calculates a next joint angle command by calculating a joint angle deviation from the tentative joint angle command and a previous joint angle command, and making the tentative joint angle command smaller such that the joint angle deviation does not exceed the rotation speed;
a forward kinematics calculating unit that calculates a next position from the next joint angle command calculated by the joint angle correcting unit; and
a correction amount calculating unit that calculates a next correction amount by adding the previous correction amount to a difference between the next position and the position command.

2. The robot apparatus according to claim 1, wherein the joint speed limiting unit makes smaller a limit value for limiting the rotation speed of the specified rotational joint according to the one of the singular point angle and the singular point distance when the one of the singular point angle and the singular point distance becomes smaller than the predetermined value.

3. A robot controlling method for drive-controlling a multi-articulated robot including a plurality of rotational joints, based on an input motion command, the method comprising:
computing, by a controlling unit, a joint angle command of each of the plurality of rotational joints, wherein the joint angle command is used for driving the multi-articulated robot based on the motion command;
moving, by the controlling unit, the multi-articulated robot by rotationally driving each of the plurality of rotational joints based on the joint angle command;
calculating, by the controlling unit, one of a singular point angle and a singular point distance of each of the plurality of rotational joints to a singular point of the multi-articulated robot; and
limiting, by the controlling unit, a rotation speed of a rotational joint specified in advance based on a type of the singular point when the one of the singular point angle and the singular point distance becomes smaller than a predetermined value,
wherein computing the joint angle command includes:
calculating a position command based on the motion command;
calculating a correction rate that is a rate of correction according to the one of the singular point angle and the singular point distance;
correcting the position command by adding a product of a previous correction amount and the correction rate;
performing inverse kinematics calculation by transforming the position command into a tentative joint angle command;
calculating a next joint angle command by calculating a joint angle deviation from the tentative joint angle command and a previous joint angle command, and making the tentative joint angle command smaller such that the joint angle deviation does not exceed the rotation speed;
performing a forward kinematics calculation by calculating a next position from the next joint angle command; and
calculating a next correction amount by adding the previous correction amount to a difference between the next position and the position command.

4. The robot controlling method according to claim 3, wherein
limiting the rotation speed includes making smaller a limit value for limiting the rotation speed of the specified rotational joint according to the one of the singular point angle and the singular point distance when the one of the singular point angle and the singular point distance becomes smaller than the predetermined value.

5. The robot controlling method according to claim 3, wherein performing the forward kinematics calculation includes calculating the next position by: obtaining a Jacobian matrix; multiplying the Jacobian matrix by a difference between the previous joint angle command and the next joint angle command; and adding a current position to an obtained product.

6. The robot controlling method according to claim 3, further comprising
removing a directional component of a deviation command from the next correction amount.

7. The robot controlling method according to claim 3, wherein
limiting the rotation speed includes calculating a maximum rotation speed change in addition to the rotation speed, and
calculating the next joint angle command includes calculating the next joint angle command by: calculating a joint angle deviation change from the tentative joint angle command, the previous joint angle command, and a joint angle command before the previous joint angle command; making the tentative joint angle command smaller such that the joint angle deviation change does not exceed a maximum joint angle deviation change; further calculating the joint angle deviation from the tentative joint angle command and the previous joint angle command; and making the tentative joint angle command smaller such that the joint angle deviation does not exceed a maximum joint angle deviation.

8. The robot controlling method according to claim 3, further comprising
performing attenuation calculation of the next correction amount at a predetermined rate.

9. A robot apparatus comprising:
a multi-articulated robot including a plurality of rotational joints; and
a controlling apparatus that drive-controls the multi-articulated robot based on an input motion command, wherein the controlling apparatus includes:
a joint angle computing unit that computes a joint angle command of each of the plurality of rotational joints for driving the multi-articulated robot based on the motion command;
wherein the joint angle computing unit includes:
a position command calculating unit that calculates a position and a deviation obtained from a position command based on the joint angle command;
a position command correcting unit that corrects the position command by a correction value obtained from an angle of a particular rotational joint to the one of a singular point or a distance to the singular point; and
a joint angle correction unit that obtains a next joint angle command from the corrected position command.

10. The robot apparatus according to claim 9, wherein the correction value includes a product of a previous correction amount and the correction value.

11. The robot apparatus according to claim 9, wherein the next joint angle command is a value corrected such that a tentative joint angle command obtained by performing an inverse kinematics calculation to the corrected position command does not exceed a maximum joint angle deviation.

12. An article manufacturing method characterized by manufacturing articles using a robot apparatus comprising:
a multi-articulated robot including a plurality of rotational joints; and
a controlling apparatus that drive-controls the multi-articulated robot based on an input motion command, wherein the controlling apparatus includes:
a joint angle computing unit that computes a joint angle command of each of the plurality of rotational joints for driving the multi-articulated robot based on the motion command;
wherein the joint angle computing unit includes:
a position command calculating unit that calculates a position and a deviation obtained from a position command based on the joint angle command;
a position command correcting unit that corrects the position command by a correction value obtained from an angle of a particular rotational joint to the one of a singular point or a distance to the singular point; and
a joint angle correction unit that obtains a next joint angle command from the corrected position command.

13. A robot controlling method for drive-controlling a multi-articulated robot including a plurality of rotational joints, based on an input motion command, the method comprising:
computing, by a controlling unit, a joint angle command of each of the plurality of rotational joints, wherein the joint angle command is used for driving the multi-articulated robot based on the motion command;
wherein computing the joint angle command includes:
calculating a position and a deviation obtained from a position command based on the joint angle command;
correcting the position command by a correction value obtained from an angle of a particular rotational joint to the one of a singular point or a distance to the singular point; and
obtaining a next joint angle command from the corrected position command.

14. A non-transitory computer-readable recording medium on which is recorded a next joint angle command obtained by using a robot controlling method for drive-controlling a multi-articulated robot including a plurality of rotational joints, based on an input motion command, the method comprising:
computing, by a controlling unit, a joint angle command of each of the plurality of rotational joints, wherein the joint angle command is used for driving the multi-articulated robot based on the motion command;
wherein computing the joint angle command includes:
calculating a position and a deviation obtained from a position command based on the joint angle command;
correcting the position command by a correction value obtained from an angle of a particular rotational joint to the one of a singular point or a distance to the singular point; and
obtaining the next joint angle command from the corrected position command.

* * * * *